J. KRING.
RAILROAD BOX CAR.
APPLICATION FILED DEC. 2, 1918.
1,322,310.
Patented Nov. 18, 1919.
2 SHEETS—SHEET 1.
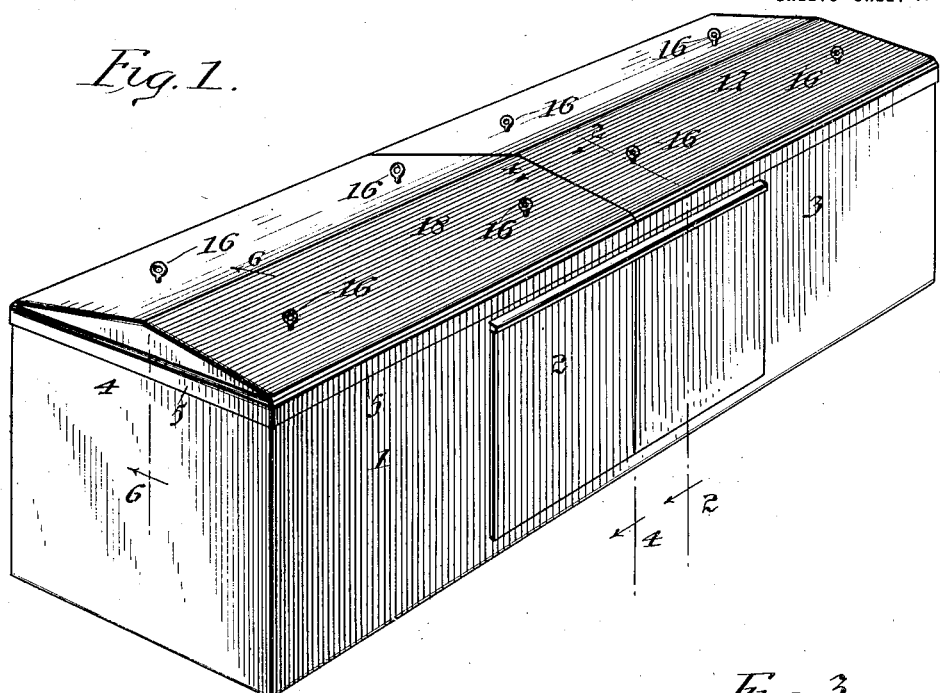
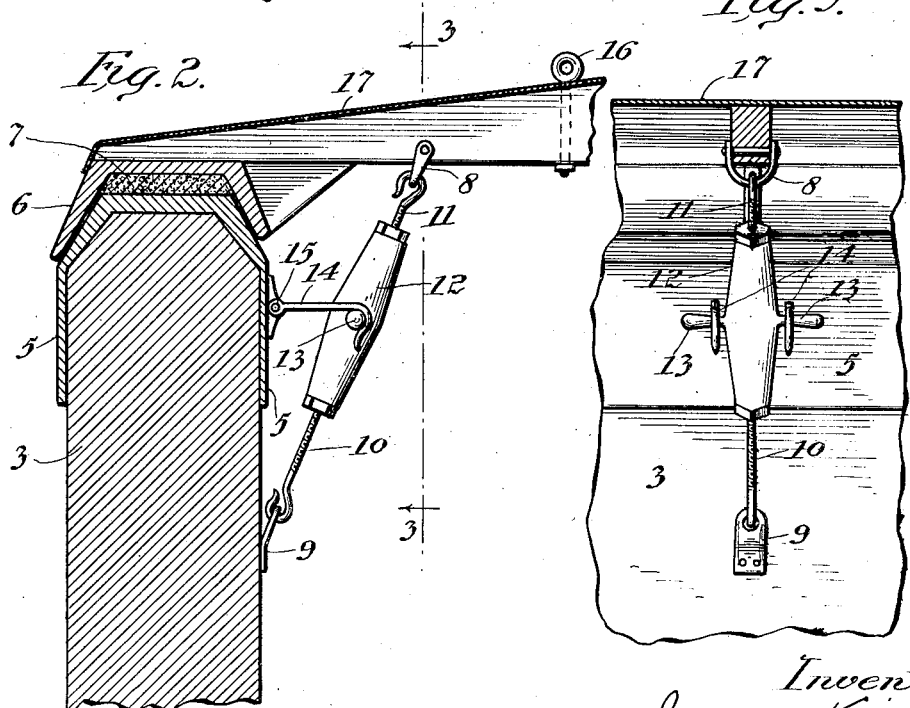
Inventor:
James Kring
By Hill & Hill Attys.

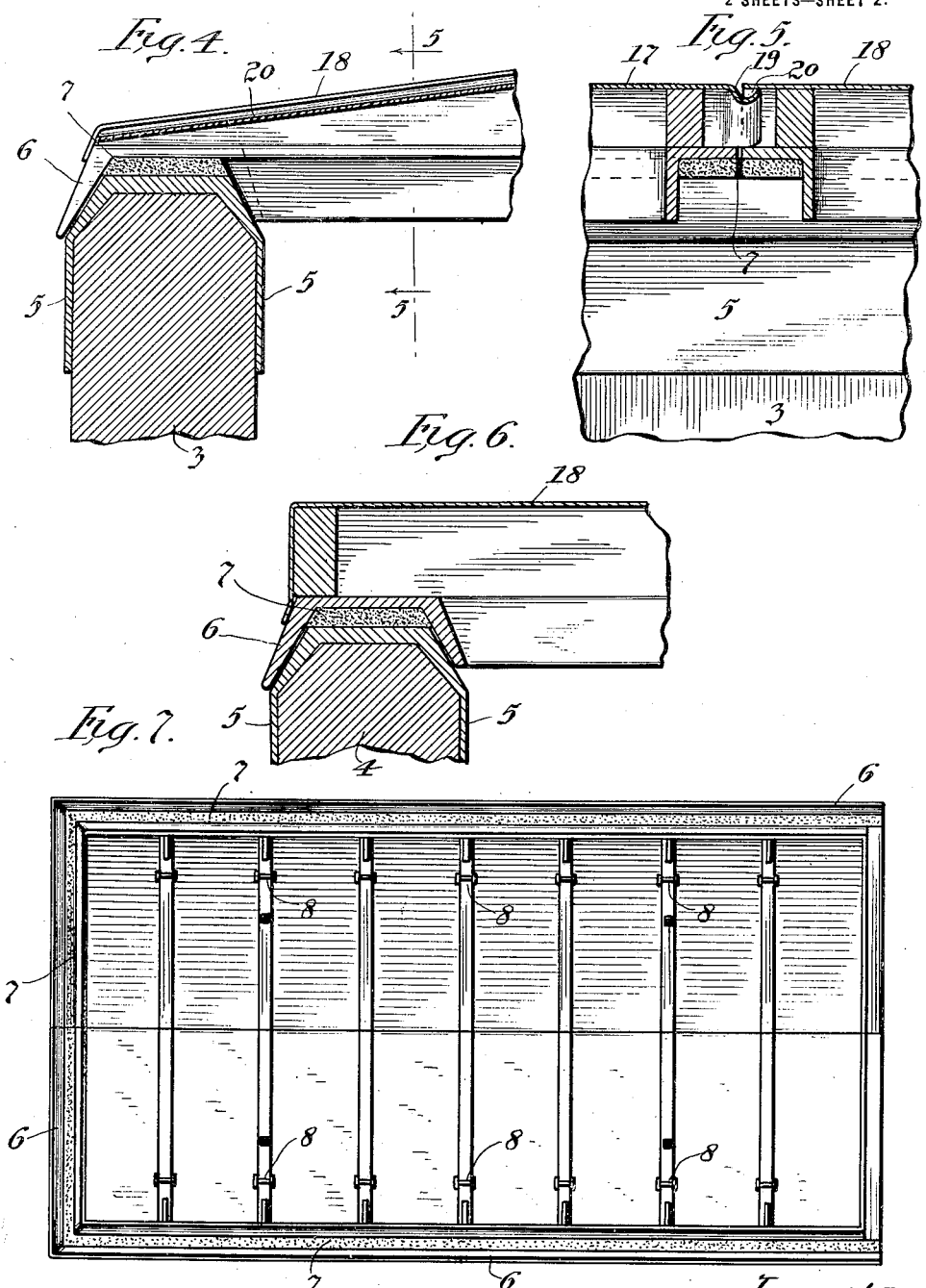

UNITED STATES PATENT OFFICE.

JAMES KRING, OF CHICAGO, ILLINOIS.

RAILROAD BOX-CAR.

1,322,310. Specification of Letters Patent. Patented Nov. 18, 1919.

Application filed December 2, 1918. Serial No. 265,023.

*To all whom it may concern:*

Be it known that I, JAMES KRING, a subject of the King of Denmark, residing at Chicago, in the county of Cook and State of Illinois, have invented certain new and useful Improvements in Railroad Box-Cars, of which the following is a description.

My invention belongs to the general type of box cars used on railroads in this country, and applies particularly to such cars as are employed in the transportation of freight, and more particularly heavy bulk freight. It has for its object a car constructed in such manner that the freight, particularly large pieces, may be more readily loaded on and unloaded from the car than is possible with the ordinary car where the freight must be passed through the side doors. To this end it consists in the novel construction, arrangement and combination of parts herein shown and described, and more particularly pointed out in the claims.

In the drawings, wherein like or corresponding reference characters indicate like or corresponding parts, Figure 1 is a perspective view of a car body embodying my invention;

Fig. 2 is a fragmentary transverse section on line 2—2 of Fig. 1;

Fig. 3 is a section on line 3—3 of Fig. 2;

Fig. 4 is a section on line 4—4 of Fig. 1;

Fig. 5 is a section on line 5—5 of Fig. 4;

Fig. 6 is a partial section on line 6—6 of Fig. 1; and

Fig. 7 is a bottom plan view of the roof of my improved car.

In the drawings, 1 represents a car body provided with the usual side door 2. The side walls are represented at 3 and end walls 4. In the preferred construction each of these walls is provided preferably with a metal cap piece 5 extending up over the top of the wall, and preferably extending down some distance on each side thereof. The roof is constructed of one or more integral parts suitably secured and braced so as to be handled as an entirety, and is detachable from the car body 1. By this means with a suitable crane or other device, the roof of the car may be lifted entirely free of the body and the car body loaded through the top, after which the roof may be replaced and firmly secured in position. Arranged about the side edges and ends of the car roof is a suitable metal hood 6 formed to coöperate with and snugly fit upon the top of the cap pieces 5. These hoods are channel-shaped with depending sides conforming substantially to the angle of the upper portion of the caps 5, so as to loosely embrace the same. In the preferred construction a suitable packing 7 of any preferred material is placed upon the top of the caps 5, upon which packing the hoods 6 rest, cushioning the juncture of the two and making a substantially water tight and air tight joint.

Suitable means are employed to firmly connect the roof to the sides in operative position. Any preferred means may be employed for this purpose. As clearly shown in Figs. 2 and 3, suitable clevices or straps 8—9 are firmly secured upon the roof and side walls of the car, and connecting rods 10—11 provided with a turn-buckle 12 or equivalent part serve to connect the two. When the parts are in position the turn-buckle may be turned up to put the proper strain to suitably and reliably engage the roof upon the side walls. It will be seen that the connecting rods 10—11 extend diagonally from the roof to the side wall high up on the latter so as to be substantially out of the way of the freight. Any preferred means may be employed to lock the turn-buckle in its strained position. As shown in the drawings, one simple method is illustrated in which the turn-buckle is provided on one or both of its sides with extending pins 13—13, and suitable hooks 14 pivotally carried at 15 upon the side 3 of the car, and positioned to extend over and engage the pins 13 to prevent accidental loosening of the turn-buckle by the vibration of the car in movement. As many of these connecting rods may be employed as is deemed necessary. When the roof consists of a single integral whole, it is probable that four may be sufficient, arranged two on each side, although obviously the number may be increased as is found necessary. The roof may be provided with suitable eyes 16 upon the top for conveniently engaging the hoisting lines in lifting the roof from the body of the car.

If preferred, the roof may be constructed in sections, facilitating the handling of the same. When this is done, suitable means should be provided for packing the joint between the sections. As shown in Fig. 5, the section 17 coöperates with the section 18, the meeting edges of the two being connected by a gutter 19 on one part coöperating with the projecting coöperating part 20 on the other, or equivalent means for the same purpose.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described, a car comprising end and side sections having the upper wall provided with a cap piece, in combination with a roof provided with a coöperating hood extending about the margins thereof constructed to be placed upon and partially embrace the cap piece, straining rods adapted to extend from the roof to the side walls to connect the two, and means for placing a strain upon said rods to reliably connect the parts in position.

2. A car comprising end and side sections, a cap piece positioned upon the upper edges of said sections, said cap piece being formed with inclined sides, in combination with a roof provided with a coöperating hood extending about the margins thereof adapted to be placed upon and partially embrace the cap piece, straining rods adapted to extend from the roof to the side walls of the car to connect the two, and turn-buckles upon the straining rods, substantially as described.

3. A car comprising end and side sections, a cap piece positioned upon the upper edges of said sections, said cap piece being provided with inclined sides, in combination with a coöperating hood extending about the margins thereof and constructed to be placed upon and partially embrace the cap piece, straining rods adapted to extend from the roof to the side walls to connect the two, said straining rods being provided with turn-buckles, and means for locking the turn-buckles in their adjusted position.

4. A car comprising end and side sections having the upper end provided with a cap piece, in combination with a roof provided with a coöperating hood extending about the margins thereof constructed to be placed upon and partially embrace the cap piece, packing material positioned between the cap piece and the hood, straining rods arranged to extend from the roof to the side walls to connect the two, means for placing a strain upon said rods and locking the same in said strained position.

5. A car comprising end and side sections having the upper wall provided with a cap piece extending about the upper edge thereof, in combination with a roof comprising a plurality of sections adapted to engage to complete the roof and prevent leakage therethrough, each of said sections provided with a coöperating hood arranged thereon to engage the upper edges of the side and end sections, straining rods arranged to extend from the roof to the car walls to connect the two, and means for placing a strain upon said rods.

6. In a device of the kind described, a car comprising side and end sections permanently connected to each other and to the floor of the car, in combination with a roof member constructed to rest upon and engage the side and end sections, and reinforcing means extending diagonally from and connecting the roof to the side members, arranged to prevent the side swaying of the top of the car.

In testimony whereof, I have hereunto signed my name in the presence of two subscribing witnesses.

JAMES KRING.

Witnesses:
 JOHN W. HILL,
 CHARLES I. COBB.